Aug. 11, 1964 P. H. SHERRON 3,144,513

TELEPHONE BOOTH

Filed May 26, 1961 2 Sheets-Sheet 1

INVENTOR.
PERCIVAL H. SHERRON
BY
Busser, Smith & Harding
ATTORNEYS

Aug. 11, 1964 P. H. SHERRON 3,144,513

TELEPHONE BOOTH

Filed May 26, 1961 2 Sheets-Sheet 2

INVENTOR.
PERCIVAL H SHERRON
BY
Busser, Smith & Harding
ATTORNEYS

United States Patent Office 3,144,513
Patented Aug. 11, 1964

3,144,513

TELEPHONE BOOTH

Percival H. Sherron, Jamaica, N.Y. (% Sherron Metallic Corp., 1201 Flushing Ave., Brooklyn 37, N.Y.)

Filed May 26, 1961, Ser. No. 112,955
9 Claims. (Cl. 179—1)

This invention relates generally to telephone booths, and particularly to improvements in open stall type telephone booths used to facilitate telephone conversations in noisy locations.

An object of the invention is to provide such a telephone booth with walls made of acoustic material and arranged to form an acoustic chamber, and with a loud-speaking telephone set mounted in the walls of the acoustic chamber in order to effectively relieve the occupant of the booth of the burden of a telephone headset or handset.

Another object is to mount the microphone and loud-speakers of such a telephone set in the walls of the acoustic chamber so that singing or humming noises due to high amplification and energy fed back from the loud-speakers to the microphone in a full duplex system are damped.

Other objects will become apparent when the following specification is read with reference to the accompanying drawings, in which.

Figure 1:
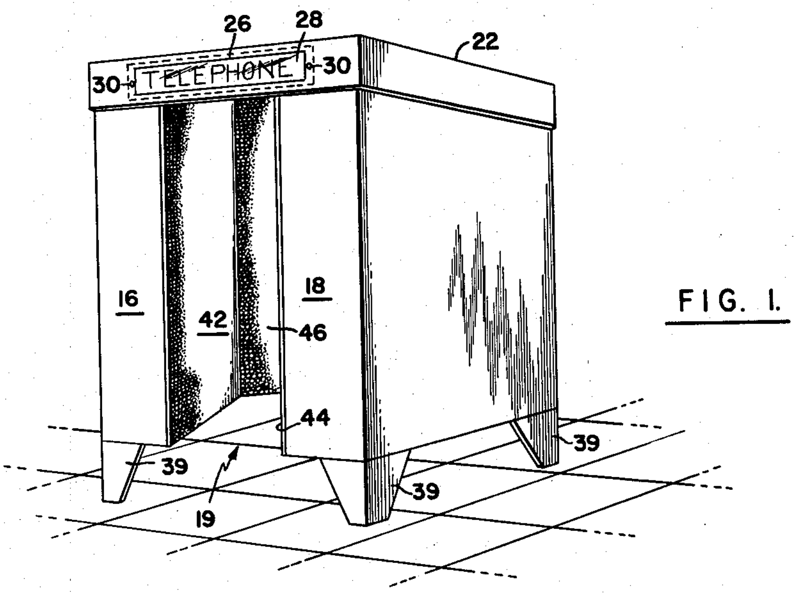
FIGURE 1 is a perspective view of a booth constructed in accordance with the invention.

Referring particularly to FIGURES 1 to 3 and FIGURE 5, the booth comprises an exterior shell rectangular in transverse section having a rear wall 10, a left side wall 12, a right side wall 14 and a front wall with portions 16 and 18 separated to form an access opening 19. Extending across the top of the booth is a ceiling panel 20, and overlying this panel is a roof pan 22 having a peripherally extending depending flange 24 embracing the top of the booth. The panel 20 and pan 22 conjointly form a ceiling chamber 23. The portion of the flange 24 extending across the front of the booth, directly over the access opening 19, is provided with a rectangular opening 26, and extending across the opening 26 is a translucent panel 28 secured in position by screws 30. The panel 28 bears the inscription "Telephone." The ceiling panel 20 is provided with a central opening 32 closed by a translucent panel 34. Within the chamber 23 and mounted upon the panel 20 is a bracket 36, which extends across the panel 34 and carries a lamp 38. The shell is supported upon four legs 39, the bottom thereof being thus raised from the floor and being open all around the shell. Preferably, the entire shell is made of sheet metal.

The interior of the booth is provided with a large absorption chamber 40 simulating a hexagon in transverse section. A pair of panels 42 and 44 diverge rearwardly respectively from the opposite side edges of the access opening 19. Each of these panels extends across the associated fore corner to the proximate side wall of the shell. Converging rearwardly respectively from the panels 42 and 44 are a second pair of panels 46 and 48. Each of these panels extends across the associated rear corner to the rear wall 10 of the shell. Disposed between the panels 46 and 48, against the rear wall 10 of the shell, directly across from the access opening 19, is a panel 50. The panels 42, 44, 46, 48 and 50 are made of acoustic material suitably bound together, as by a stiff perforated membrane (not shown). Among the materials that may be used are animal hair, cotton, asbestos, mineral wool and the like. Preferably, at least panels 46, 48 and 50 are made approximately three inches thick in order to adsorb a large part of the sound spectrum.

At a suitable height from the floor, in the center of the panel 50, is an opening having in the rear of the panel a large diameter section 52 and in the front of the panel a small diameter section 54. Fitted into the large diameter section 52 is a microphone 55. Below the microphone 55 is a telephone dial 56. Mounted in the panels 46 and 48 respectively are loud-speakers 58 and 60. Extending across the rear of the chamber 40, below the dial 56, is a shelf 62, which may have formed therein several coin slots 64 communicating with a coin box 66 underlying the shelf 62. Also underlying the shelf 62 is a bell box 68. A manual volume control member 72 may be mounted on the shelf 62. Alternatively, the circuitry may comprise an automatic volume control as is well known in the art.

Figures 2, 3, 4:
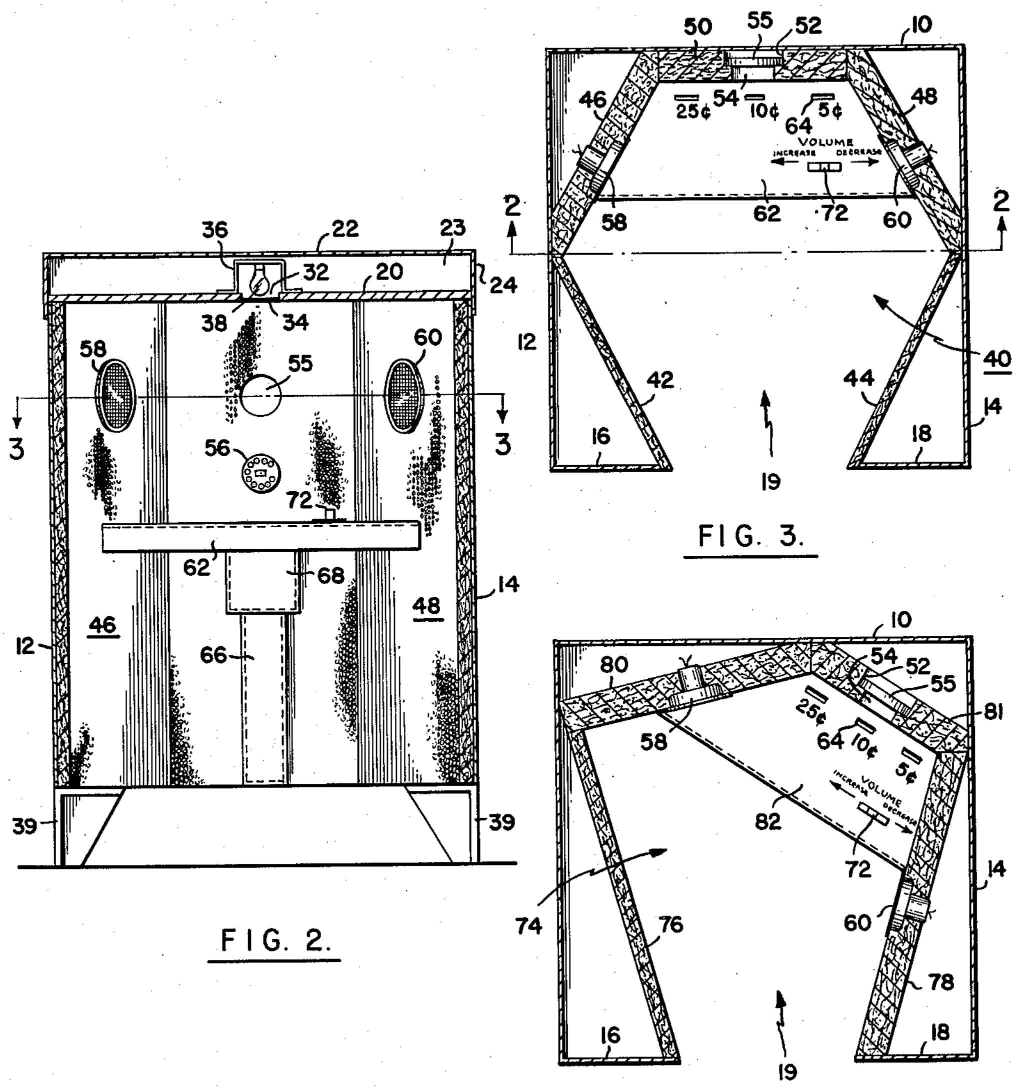
FIGURE 2 is a vertical section through the booth looking toward the rear thereof.
FIGURE 3 is a horizontal section on the plane indicated by line 3—3 of FIGURE 2.
FIGURE 4 is similar to FIGURE 3, but shows a modified form of the booth.

Referring particularly to FIGURE 4, the adsorption chamber, designated 74, simulates a pentagon in transverse section. A pair of panels 76 and 78 diverge rearwardly respectively from the opposite side edges of the access opening 19. Each of these panels extends across the associated fore corner to the proximate side wall of the shell. Converging rearwardly respectively from the panels 76 and 78 are a second pair of panels 80 and 81. Each of these panels extends across the associated rear corner to the rear wall 10 of the shell, the panels 80 and 81 meeting at the rear wall 10. The panels 76, 78, 80 and 81, like the panels 42, 44, 46, 48 and 50, are made of acoustic material. Preferably at least the panels 78, 80 and 81 are approximately three inches thick.

The microphone 55 is mounted, as shown in the panel 81, and the loud-speakers are mounted, as shown, respectively in the panels 78 and 80. The modified form of the booth is provided with a shelf 82 extending forwardly from the panel 81, between the panels 78 and 80. Control means may be provided on the shelf, e.g., the several coin slots 64 or volume control switch 72. Underlying the shelf 82 are coin box 66 and bell box 68 (not shown).

In each embodiment of the invention, the fore and aft maximum inside dimension of the absorption chamber is approximately the same as the fore and aft dimension of the outer shell, and the crosswise maximum inside dimension of the absorption chamber is approximately the same as the crosswise dimension of the outer shell. In addition, the microphone 55 and the loud-speakers 58 and 60 all face toward the center of the booth. Furthermore, the microphone 55 is deeply embedded in its acoustic mounting panel, the opening 54 being considerably less than the size of the microphone so as to form a deep cavity restricted in cross-sectional area. Still further, the size of the absorption chamber is such that an adult occupant of the booth may stand comfortably approximately in the center of the absorption chamber close to the shelf, with his mouth directly in front of and close to the microphone.

Figure 5:
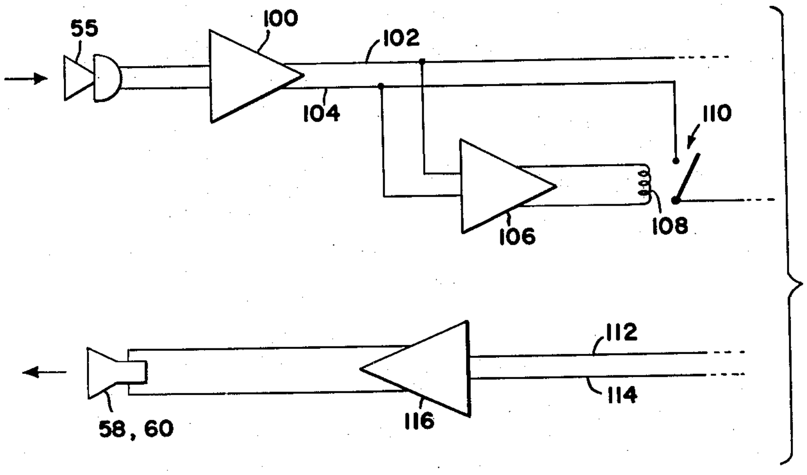
FIGURE 5 is a schematic block diagram of the loud-speaking telephone set.

The circuitry for the apparatus in accordance with this invention is shown in FIGURE 5. The microphone 55 is connected to an amplifier 100 which is connected to the telephone lines through the connectors 102 and 104. A suitable voice-actuated relay is provided and comprises a relay amplifier 106 connected in parallel to amplifier 100 and a solenoid 108 positioned to actuate the movable arm of a switch 110 serially connected in the connector 104. Switch 110 is normally open and is actuated to a closed position upon energization of the voice-actuated relay in response to someone speaking into the microphone 55.

When the occupant of the booth speaks into the microphone 55, the audio signal is amplified by the amplifiers 100 and 106, the latter providing a signal to energize solenoid 108 which causes closing of switch 110. With the switch 110 in a closed position, a signal is transmitted from the microphone 55, through amplifier 100 and to the telephone lines through the connectors 102 and 104.

The incoming signals from the telephone lines are transmitted through connectors 112 and 114 and through a suitable amplifier 116 which will amplify the signals passing through the lines 112 and 114 and then deliver the amplified signals to speakers 58 and 60. The amplifier 116 may be of the transistor type with sufficient gain and output to increase the audible sounds to loud speaker volume and attenuated to a degree such that the speaker output will not be heard outside the booth.

Singing or humming noises due to high amplification and energy fed back from the loud-speakers to the microphone are damped due to (1) the sound absorbing properties of the material out of which the walls of the absorption chamber are made, (2) the configuration of the absorption chamber, whereby reflected energy is directed away from the microphone, (3) the deep absorption cavity 54, which makes it difficult for the microphone to pick up sounds unless they are emitted directly in front of the microphone, and (4) the disposition of the speakers relative to the microphone, whereby they face toward the center of the absorption chamber, away from the microphone. Thus, while words spoken directly into the microphone are readily picked up and transmitted, energy fed back from the loud-speakers to the microphone is effectively damped. Furthermore, a voice actuated relay requires a high operating level. Therefore, the system is not over-sensitive to energy feed back.

It will be understood, of course, that the present invention is susceptible of various modifications which may be made without departing from the general principles of the invention. Accordingly, it is intended to claim the same broadly as well as specifically, as indicated by the appended claims.

What is claimed is:

1. In combination, a telephone booth comprising an outer shell having upright walls, sound absorbing material arranged within said shell to form an absorption chamber having upright walls, and means extending across said booth and closing the top of said shell and chamber, the front of said booth being permanently open to afford ingress to and egress from said chamber, and a loud-speaking telephone set comprising a microphone, a plurality of loud-speakers, said microphone and loud-speakers being mounted in the walls of and so as to face the center of said chamber, said loud-speakers facing away from said microphone, and means for operatively connecting said microphone and loud-speakers to a telephone line.

2. In combination, a telephone booth comprising an outer shell having upright walls, a plurality of upright wall panels made of sound absorbing material arranged within said shell to form an absorption chamber, and means extending across said booth and closing the top of said shell and chamber, the front of said booth being permanently open to afford ingress to and egress from said chamber, and a loud-speaking telephone set comprising a microphone mounted in a first one of said wall panels, a pair of loud-speakers mounted respectively in a pair of said wall panels respectively on opposite sides of said first wall panel, said microphone and loud-speakers facing toward the center of said chamber, and means for operatively connecting said microphone and loud-speakers to a telephone line.

3. In combination, a telephone booth comprising an outer shell having upright walls, a plurality of upright wall panels made of sound absorbing material arranged within said shell to form an absorption chamber, and means extending across said booth and closing the top of said shell and chamber, the front of said booth being permanently open to afford ingress to and egress from said chamber, and a loud-speaking telephone set comprising a microphone mounted in a first one of said wall panels and having a front set back from the face of said panel a substantial distance and exposed to the interior of said chamber through a restricted opening, a pair of loud-speakers mounted respectively in a pair of said wall panels respectively on opposite sides of said first wall panel, and means for operatively connecting said microphone and loud-speakers to a telephone line.

4. In combination, a telephone booth comprising an outer shell having upright walls, a plurality of upright wall panels made of sound absorbing material arranged within said shell to form an absorption chamber, and means extending across said booth and closing the top of said shell and chamber, the front of said booth being permanently open to afford ingress to and egress from said chamber, and a loud-speaking telephone set comprising a microphone mounted in a first one of said wall panels and having a front set back from the face of said panel a substantial distance and exposed to the interior of said chamber through a restricted opening, a pair of loud-speakers mounted respectively in a pair of said wall panels respectively on opposite sides of said first wall panel, said microphone and loud-speakers being faced toward the center of said chamber, and means for operatively connecting said microphone and loud-speakers to a telephone line.

5. In combination, a telephone booth comprising an outer shell having upright walls, a plurality of upright wall panels made of sound absorbing material arranged within said shell to form an absorption chamber, means extending across said booth and closing the top of said shell and chamber, the front of said booth being permanently open to afford ingress to and egress from said chamber, and a horizontally extending shelf in front of a first one of said wall panels, and a loud-speaking telephone set comprising a microphone mounted in said first wall panel above said shelf and having a front set back from the face of said panel a substantial distance and exposed to the interior of said chamber through a restricted opening, a pair of loud-speakers mounted respectively in a pair of said wall panels respectively on opposite sides of said first wall panel, said microphone and loud-speakers being faced toward the center of said chamber, and means for operatively connecting said microphone and loud-speakers to a telephone line including control switch means.

6. In combination, a telephone booth comprising an outer shell having upright walls, a plurality of upright wall panels made of sound absorbing material arranged within said shell to form an absorption chamber, means extending across said booth and closing the top of said shell and chamber, the front of said booth being permanently open to afford ingress to and egress from said chamber, and a horizontally extending shelf having a plurality of coin slots formed therein and disposed in front of a first one of said wall panels, and a loud-speaking telephone set comprising a microphone mounted in said first wall panel above said shelf and having a front set back from the face of said panel a substantial distance and exposed to the interior of said chamber through a restricted opening, a pair of loud-speakers mounted respectively in a pair of said wall panels respectively on opposite sides of said first wall panel, said microphone and loud-speakers being faced toward the center of said chamber, and means for operatively connecting said microphone and loud-speakers to a telephone line.

7. In combination, a telephone booth comprising an upright outer shell rectangular in transverse section, a ceiling panel resting upon said shell and closing the top thereof, a roof pan disposed in overlying spaced relation to said ceiling panel and having a depending flange embracing the upper end of said shell whereby to form conjointly with said ceiling panel a ceiling chamber, a plurality of upright wall panels made of sound absorbing material arranged within said shell to form an absorption chamber, the front of said booth being permanently open to afford ingress to and egress from said chamber, an inscription bearing translucent panel mounted in the flange of said roof pan over said opening, a translucent panel in said ceiling panel, and an electric lamp in said ceiling chamber over the last-mentioned translucent panel for illuminating the interior of said absorption chamber and the inscription bearing translucent panel, and a loud-speaking telephone set comprising a microphone, a plurality of loud-speakers, said microphone and loud-speakers being mounted in the walls of and so as to face the center of said chamber, said loud-speakers facing away from said microphone, and means for operatively connecting said microphone and loud-speakers to a telephone line.

8. In combination, a telephone booth comprising an upright outer shell having front, rear and opposite side walls and rectangular in transverse section, means extending across said shell and closing the top thereof, and a plurality of upright wall panels made of sound absorbing material arranged within said shell to form an absorption chamber having a pair of said panels diverging rearwardly from the opposite side edges of an access opening formed in the front wall of said shell, said opening being of a width approximately one-half that of said front wall, each panel of said diverging pair thereof being disposed across the associated fore corner of said shell, and having another pair of said panels converging rearwardly respectively from said diverging pair of panels, each panel of said converging pair thereof being disposed across the associated rear corner of said shell, the maximum inside dimensions of said absorption chamber fore and aft and crosswise being approximately the same as those of said shell, and a loud-speaking telephone set comprising a microphone mounted in a first one of said panels and having a front set back from the face of said panel a substantial distance and exposed to the interior of said chamber through a restricted opening, a pair of loud-speakers mounted respectively in a pair of said wall panels respectively on opposite sides of said first wall panel, and means for operatively connecting said microphone and loud-speakers to a telephone line, the size of said absorption chamber being such that an adult occupant of the booth may stand approximately in the center thereof with his mouth directly in front of and close to said microphone.

9. In combination, a telephone booth having sound absorbing inner walls, a loud-speaking telephone set comprising a microphone and a plurality of loud-speakers, said microphone and loud-speakers being mounted in said booth so as to face toward the center thereof with said loud-speakers facing away from said microphone, and means operatively connecting said microphone and loud-speakers to a telephone line.

References Cited in the file of this patent

UNITED STATES PATENTS

| | | |
|---|---|---|
| 2,581,251 | Glazer | Jan. 1, 1952 |
| 3,031,040 | Torbett | Apr. 24, 1962 |